United States Patent [19]
Kirchberg, Jr. et al.

[11] Patent Number: 5,107,192
[45] Date of Patent: Apr. 21, 1992

[54] MAGNETIC BEARING CONTROL AT CRITICAL SHAFT SPEEDS

[75] Inventors: Maurice A. Kirchberg, Jr., Dubuque, Iowa; Alexander Cook, Rockford, Ill.

[73] Assignee: Sundstrand Corporation, Rockford, Ill.

[21] Appl. No.: 633,760

[22] Filed: Dec. 26, 1990

[51] Int. Cl.⁵ ............................................. H02K 1/00
[52] U.S. Cl. ..................................... 318/540; 318/611
[58] Field of Search ............... 318/135, 38, 128, 129, 318/572, 611, 630, 632, 640, 645, 652, 686, 536, 535, 540, 696, 561; 310/90, 90.5, 91, 51; 74/5.6 D, 5.6 E, 5.7, 36, 52, 89, 19

[56] References Cited

U.S. PATENT DOCUMENTS

| | | | |
|---|---|---|---|
| 2,399,329 | 4/1946 | Beauregard | 318/611 X |
| 4,219,767 | 8/1980 | Wimmer | 318/611 X |
| 4,421,207 | 12/1983 | Falconer | 368/168 X |
| 4,446,412 | 5/1984 | Friedman et al. | 318/696 |
| 4,473,259 | 9/1984 | Goldowsky | 310/90.5 X |
| 4,950,966 | 8/1990 | Moulds, III | 318/561 |
| 5,012,170 | 4/1991 | Atlas | 318/611 |

*Primary Examiner*—William M. Shoop, Jr.
*Assistant Examiner*—A. Jonathan Wysocki
*Attorney, Agent, or Firm*—Whitham & Marhoefer

[57] ABSTRACT

In a magnetic bearing system, the longitudinal shaft position is shifted relative to the bearing position so that a force can be applied by the bearings away from a node at critical shaft speeds. In one embodiment, the shaft is shifted by end thrust bearings back and forth on an integral cycle basis. Alternatively, closely-spaced bearing pairs may be used and energized alternately on an integral cycle basis in order to shift back-and-forth the region at which the combined effective force of the bearing is applied.

6 Claims, 2 Drawing Sheets

MAGNETIC BEARING CONTROL AT CRITICAL SHAFT SPEEDS

CROSS REFERENCE TO RELATED APPLICATION

The disclosure of this application is related in subject matter to that of the following U.S. application. Ser. No. 0763,755 filed Dec. 26 1990, (abandoned) by Maurice A. Kirchberg, Jr., and Alexander Cook for "Harmonic Control Method for Magnetic Bearings"; which are assigned to the assignee of this application. The disclosures of this application are incorporated herein by reference.

BACKGROUND OF THE INVENTION

1. Field of the Invention

The present invention generally relates to magnetic bearing systems, and more particularly to a system to dampen mechanical oscillation in the shaft supported by the bearing, at critical shaft speeds.

2. Description of the Prior Art

As will be appreciated by those skilled in the art, a flexible rotating shaft, such as a typical motor or generator shaft, has a tendency to vibrate due to unavoidable unbalance forces. The vibration causes a oscillation of the shaft about its longitudinal axis. For a given unbalanced force, the frequency of the oscillation is a function of rotational velocity. The resonant frequency of the shaft is a function of shaft parameters such as stiffness and shaft length between the bearings. Thus, as the shaft speed changes the frequency of shaft oscillation changes; as the speed increases the frequency increases.

As will also be understood by those skilled in the art, shaft bearings constrain the shaft and tend to dampen these oscillations except at certain critical shaft speeds at which the shaft oscillates at the resonant frequency of the supported shaft. In this situation an oscillation node occurs at the bearings and the bearings exert little or no dampening force on the shaft since there is no shaft displacement at the bearing locations in this situation.

There are a number of magnetic bearing systems in the prior art in which the energization of the bearing is controlled to dampen shaft oscillation. These prior art magnetic bearing systems do not exert a damping force on the shaft at those critical shaft speeds at which an oscillation node and the bearings coincide.

SUMMARY OF THE INVENTION

An object of this invention is the provision of a magnetic bearing system which can dampen oscillation of a shaft suspended therein at critical shaft speeds; i.e., those shaft speeds at which an oscillation node is located at the bearings.

Briefly, this invention contemplates the provision of a magnetic bearing system in which the longitudinal shaft position is shifted relative to the bearing position so that a force can be applied by the bearings away from a node at critical shaft speeds. In one embodiment, the shaft is shifted b end thrust bearings back and forth on an integral cycle basis. Alternatively, closely-spaced bearing pairs may be used and energized alternately on an integral cycle basis in order to shift back-and-forth the region at which the combined effective force of the bearing is applied.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
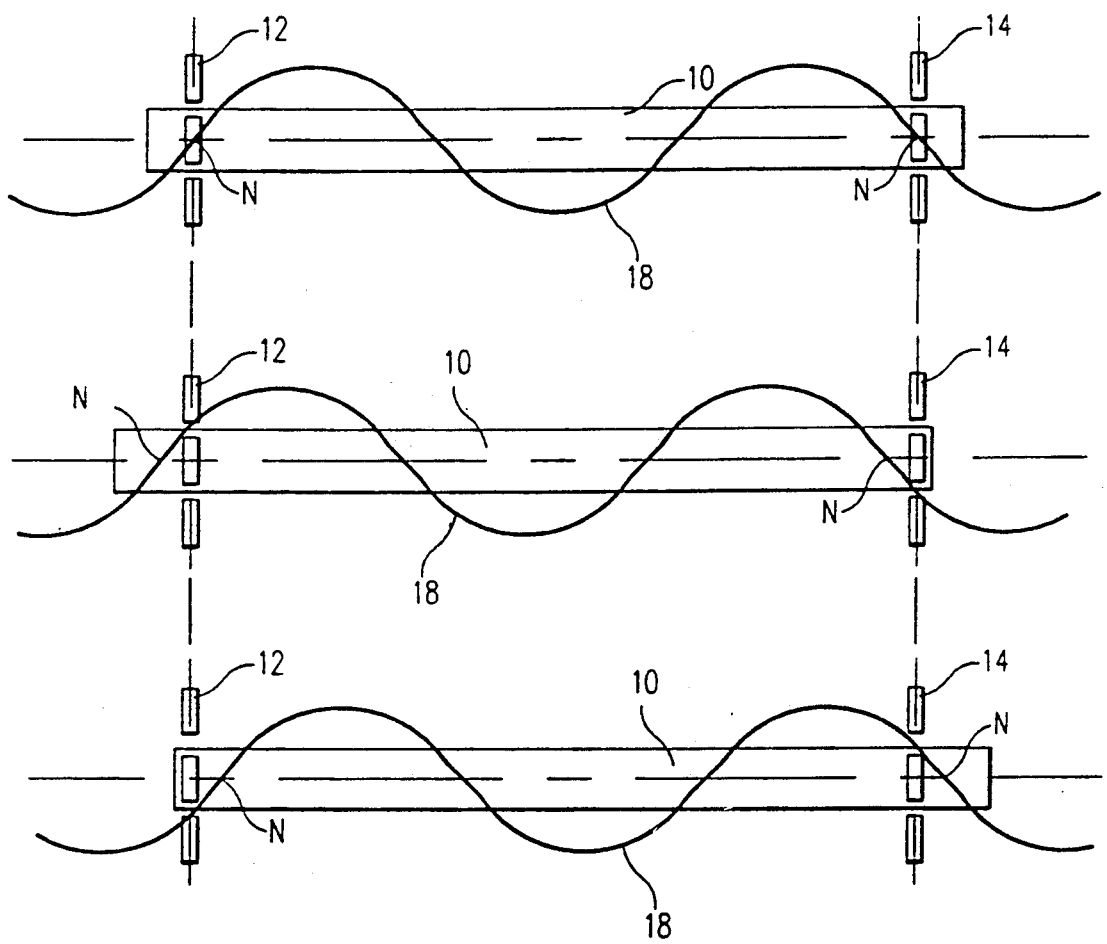
FIG. 1 is a schematic drawing showing three positions of a shaft relative to its supporting magnetic bearings as it is moved relative to these bearings. Superimposed on the figures is a waveform illustrating shaft displacement due to oscillation as a critical shaft rotational velocity.

Referring now to FIG. 1, unbalanced forces as a practical matter are unavoidable. These forces acting on a rotating shaft 10, such as a motor or generator shaft, cause an oscillating displacement of the shaft axis position which propagates along the length of the shaft. For a given unbalanced force, the frequency of the oscillation is a function of the rotational frequency. The wavelength of the oscillation is a function of oscillating frequency, shaft stiffness, and the length of the shaft between its supports, here magnetic bearings 12 and 14. At certain critical shaft rotational speeds, the oscillation frequency matches the resonant frequency of the shaft and bearing system. In this situation, illustrated by the waveform 18 in FIG. 1, there are an integral number of cycles between the bearings with a node N at each bearing 12 and 14.

It will be appreciated that at this critical shaft speed, the bearings 12 and 14 cannot exert an appreciable force on the shaft to counteract the oscillation since there is little or no displacement of the shaft in the region of the bearings at this critical shaft speed. In accordance with the teachings of this invention, and as illustrated in FIG. 1, the shaft 10 is shifted back-and-forth longitudinally relative to the bearings 12 and 14 from one side to the other of the nominal bearing position 12' and 14'. The shaft is maintained in a shifted position for an integral number of rotational cycles; for example, one to five rotational cycles in the relative position of FIG. 1 and an equal number of rotational cycles in the relative position shown in FIG. 2. As will be appreciated from an inspection of the drawing FIG. 2, with the shaft repositioned relative to the bearings, there is an appreciable displacement of the shaft due to oscillation at a critical shaft speed. As will be explained in more detail in connection with FIG. 2, a suitable magnetic bearing controller of either a design known in the art or of the design disclosed in our copending application Ser. No. 633,755 filed Dec. 26, 1990 may be used to energize the bearings 12 and 14 in order to oppose the oscillator displacement at the bearing and thereby dampen it.

Figure 2:
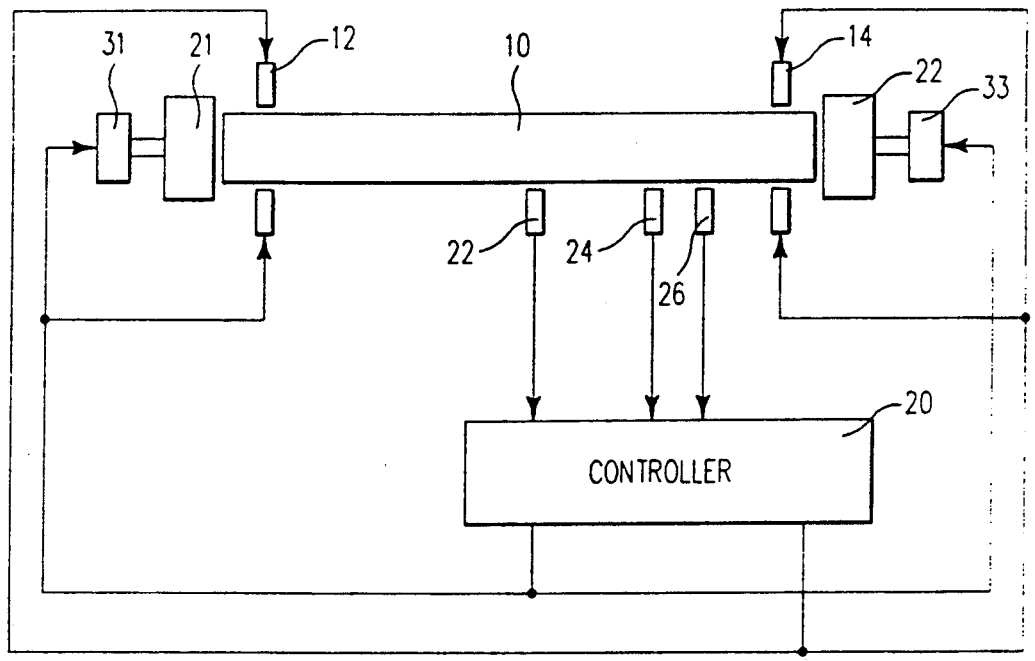
FIG. 2 is a block diagram of one embodiment of a magnetic bearing system in accordance with the teachings of this invention.

Referring now to FIG. 2, the rotating shaft 10 is suspended between two magnetic bearings 12 and 14 which may be of a known prior art design suitable for the application. A movable thrust bearing 21 at the left hand end of the shaft and a similar thrust bearing 23 at the right hand shaft end moves the shaft 10 back-and-forth on an integral cycle basis at critical shaft rotational speeds at which an oscillation node N occurs at the bearings. For a given system and unbalance force the critical shaft speed at which a node occurs at the bearing is a function of shaft speed and the critical speed can be calculated from these parameters or determined empirically. This critical speed or speeds can be stored in either digital or analogue form in a controller 20. The shaft rotational speed is compared to the stored value or values. At a critical speed the controller 20 causes the shaft to move back-and-forth relative to the nominal bearing position.

A sensor 22 produces an output signal indicative of shaft rotational speed, which signal is coupled to the controller 20. Another sensor 24 provides a phase reference signal to the controller, such as for example an output pulse in response to detection of a mark on the shaft. And still another sensor 26, located closely adjacent each bearing, generates an output signal indicative of the amplitude of the oscillatory shaft displacement. This signal is also coupled to the controller 20 as indicated in the drawing. The controller 20 generates an output signal which controls the movement of the thrust bearings 21 and 23 when the shaft rotational speed reaches a critical shaft speed as determined by the value stored in the controller. These thrust bearings are mounted so that they can move relatively to the magnetic bearings. A solenoid or motor indicated schematically at 31 drives the shaft 10 a predetermined distance to the right in response to a command from controller. After a predetermined number of revolutions of the shaft in the position illustrated in FIG. 1, the controller issues a command which causes motor or solenoid 33 to drive the shaft to the position shown in FIG. 1. When the shaft speed changes so that it is no longer a critical speed, an output from controller causes motor 31 or motor 33 or both to reposition the shaft to the position shown in FIG. 1.

The controller 20 also modulates the bearing energization to generate a bearing force to oppose shaft oscillation at all shaft speeds, both critical and non-critical speeds. Although prior art control systems may be used for this function, preferably the system used is that disclosed in our co-pending application Ser. No. 07/521742, filed May 10, 1990. As disclosed in that application, a pulse-width-modulating pattern is selected to modulate the bearing excitation in order to dampen oscillation based on the Fourier components of the oscillation for harmonics of interest. Inputs of shaft speed, shaft rotational phase with respect a reference, and deflection amplitude are used to select a proper modulating signal to dampen the oscillation.

In operation, at shaft speeds other than a critical shaft speed the controller modulates the bearing excitation to dampen shaft oscillation in its usual mode of operation. At a critical shaft speed, the thrust bearings move the shaft back-and-forth as previously explained, on an integral cycle basis; for example, five cycles in the position illustrated in FIG. 1 and five cycles in the position shown in FIG. 1. The controller 20 calculates the phase of the oscillation at each position of the shaft based upon the distance of the position from the nominal bearing position and the frequency of the oscillation at the critical shaft speed. The controller reverses the polarity of the modulating signal at each bearing each time the shaft position changes between the positions of FIG. 1.

Figure 3:
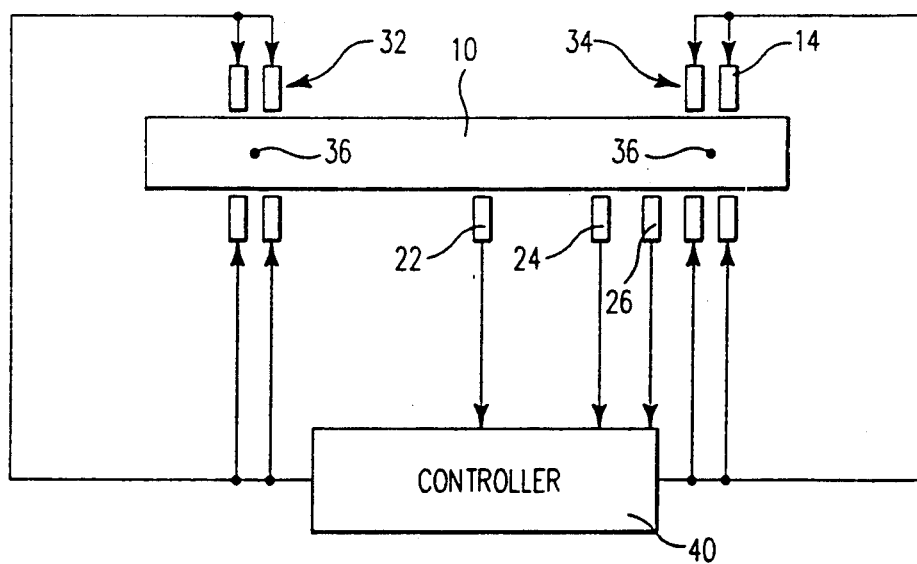
FIG. 3 is a block diagram similar to FIG. 2 of an alternate embodiment of the invention.

Referring now to FIG. 3, as an alternative to moving the shaft to achieve relative movement between the shaft and the bearing, the effective location of the bearing can be changed at critical shaft speeds. Here a pair of bearings is located at each end of the shaft 10, the left-hand pair designated by the general reference numeral 32 and the right-hand pair designated by the general reference numeral 34. At non-critical shaft speeds, a controller 40 energizes each half of the bearing pair equally so that the resultant force applied by the pair lies approximately midway between the pair (the region designated by reference numeral 36 on the left-hand side and 38 on the right-hand side). At a critical shaft speed, the controller changes the relative energization of the bearing pair halves, increasing one and decreasing the other, changing the effective location of force application to one side of the center for an integral number of shaft revolutions and then decreasing the one and increasing the other to shift the region of effective force application to the other side of the center. This has the same effect as moving the shaft relative to the bearing as disclosed in FIG. 2. The controller 40 controls both the relative shaft position at a critical speed and the bearing pair excitation modulation in the manner described in connection with FIG. 2 in order to dampen the shaft oscillation.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for controlling oscillation of a shaft in a magnetic bearing which applies a force on said shaft at a pre-determined location along said shaft, comprising in combination:

means for energizing said bearing;

means for controlling said energizing means to generate a force in said bearing to oppose oscillation of said shaft;

means for determining a shaft rotational speed at which a node of said oscillation occurs at said pre-determined location; and means responsive to said determining means to move said shaft in a longitudinal direction relatively to the location of applied bearing force at a rotational speed at which a node occurs at said pre-determined location.

2. A system for controlling oscillation of a shaft in a magnetic bearing as in claim 1 wherein responsive means moves said shaft back and forth relative to said pre-determined location.

3. A system for controlling oscillation of a shaft in a magnetic bearing as in claim 1 wherein said shaft moves and said bearing is stationary.

4. A system for controlling oscillation of a shaft in a magnetic bearing as in claim 1 wherein the location of applied bearing force moves and said shaft is stationary.

5. A system for controlling oscillation of a shaft in a magnetic bearing as in claim 2 wherein said shaft moves and said bearing is stationary.

6. A system for controlling oscillation of a shaft in a magnetic bearing as in claim 3 wherein the location of applied bearing force moves and said shaft is stationary.

* * * * *